Sept. 8, 1970         P. E. VILLAIN         3,526,927
METHOD AND APPARATUS FOR MAKING ARTIFICIAL SKINS
Filed Nov. 21, 1966
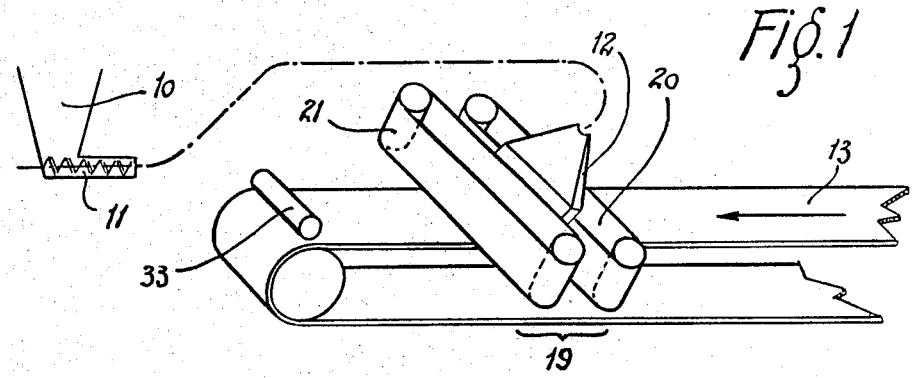
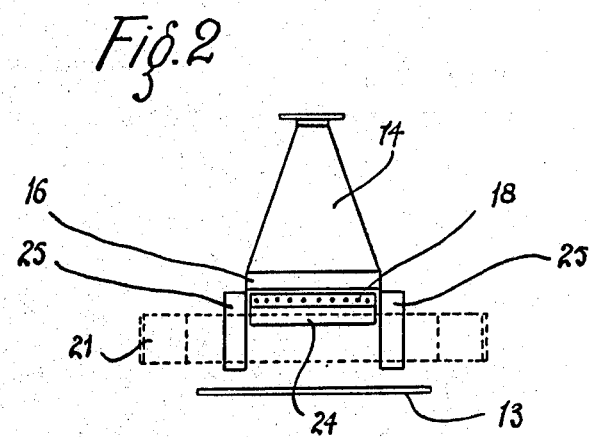
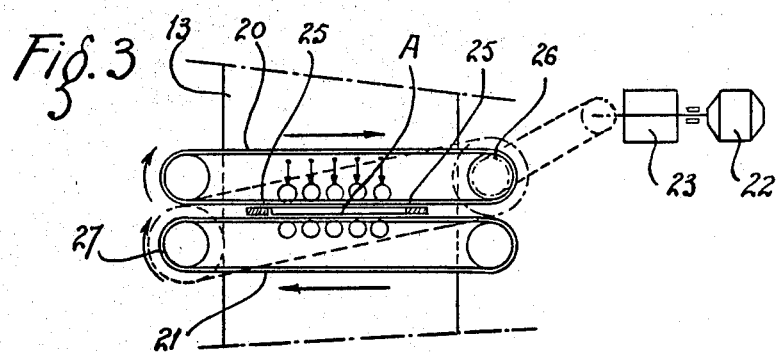
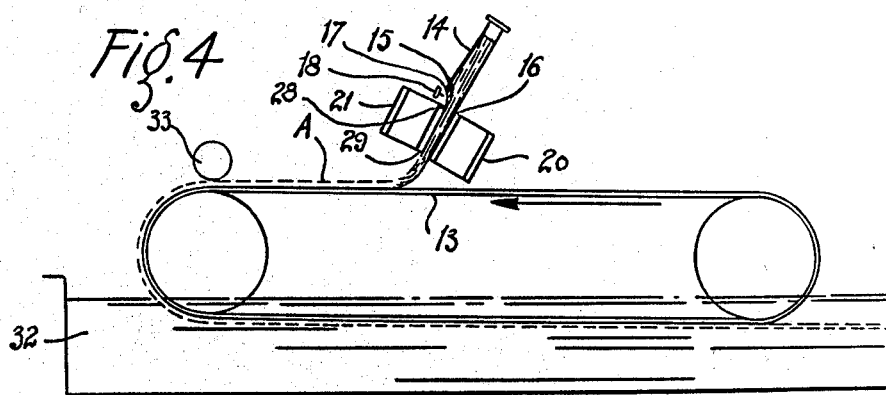
INVENTOR.
PIERRE EDOUAR
Villain
BY
ATTORNEY United States Patent Office 3,526,927
Patented Sept. 8, 1970

3,526,927
METHOD AND APPARATUS FOR MAKING ARTIFICIAL SKINS
Pierre Edouard Villain, Beauvais, France, assignor to Novacel, S.A., Paris, France, a corporation of France
Filed Nov. 21, 1966, Ser. No. 595,855
Claims priority, application France, Nov. 22, 1965, 39,272; Apr. 15, 1966, 57,763
Int. Cl. B29d 3/02
U.S. Cl. 18—4
3 Claims

ABSTRACT OF THE DISCLOSURE

Apparatus for preparing an artificial skin through the production of a continuous sheet of paste with subsequent disorientation of fibers incorporated therein without any reduction in the thickness of the sheet. Said apparatus comprises an extrusion means for said paste, a means for distributing said paste in a continuous sheet, an endless conveyor receiving said sheet, and a treatment bath for coagulating and finishing said sheet, said paste-distributing means comprising an extrusion box producing a sheet of paste, two belts disposed at right angles to said conveyor and adapted to be driven in movement, the sides of said belts which face each other being displaced in opposite directions, and two adjustable lateral guides limiting the space between said two belts, said belts inducing a rolling effect on the sheet.

---

The present invention relates to the manufacture of artificial skins, in particular of cellular regenerated cellulose, such as those imitating chamois skins or leathers.

Artificial chamois leathers are well known and used for domestic purposes. They are prepared in particular by extruding a sheet of paste consisting of a suitable mixture of viscose, porophorous or pore-producing material and reinforcing fibers, which is then subjected to a coagulating and finishing treatment.

The reinforcing fibers introduced into the paste increase the strength and firmness of the chamois leathers. It is obvious that the increase in the strength occurs in the direction corresponding to the longitudinal direction of the fibers and it is well known that, in order to obtain chamois leathers having strength values which are balanced in the longitudinal direction and the transverse direction, it is necessary to cause disorientation of the fibers, so that these fibers do not have any preferred orientation, which would give the finished product a greater strength in a given direction.

The present invention has for an object to provide a new process and apparatus for the manufacture of artificial chamois leathers, in particular of regenerated cellulose having equal strength in both directions.

In accordance with this invention, a sheet is formed by means of a slotted die from a paste consisting of a suitable mixture of viscose, porophorous material and reinforcing fibers, with laminar flow of the paste giving the fibers a certain orientation in the longitudinal direction of the sheet. On leaving the die, the sheet formed in this way is subjected to transverse friction, but without any appreciable reduction in thickness, by passing the sheet between two belts moving at right angles to the direction of extrusion and adapted to cause a slipping of the various layers of the sheet on one another and a disorientation of the fibers. The sheet of paste is fixed on leaving the die. The fixed sheet in which the incorporated fibers are disoriented in all directions without any preferred direction is deposited on a conveyor belt conducting the said sheet towards the conventional treatment baths.

The artificial skin or leather obtained in this way has an improved internal cohesion, a toughness in the transverse direction which is equal to the toughness in the longitudinal direction and improved resistance to twisting and wear.

More specifically, the apparatus comprises an extrusion die of adjustable width, guide means for the sheet which are constituted by a flexible box mounted on the die, two friction belts moving in opposite directions and at right angles to the movement of the sheet and a conveyor belt which may or may not have patterns on the face in contact with the extruded sheet.

The invention will be more fully described with reference to the following description taken in connection with the accompanying drawings.

In the drawings:

FIG. 1 is a perspective view of the paste extruding and rolling system;

FIG. 2 is a front elevational view of the die and the rolling mechanism;

FIG. 3 is a horizontal section of the rolling mechanism;

FIG. 4 is a longitudinal section of the complete installation.

According to the usual method of manufacturing artificial skins, for example imitation chamois leathers, from cellular regenerated cellulose, the material prepared in the form of a paste is placed in a hopper 10 and conducted by a constant-delivery screw conveyor 11 to a die 12 from which it issues in the form of a sheet A spreading out on an endless conveyor belt 13 which carries it along towards the coagulating and finishing bath. The paste consists of regenerated cellulose in the form of viscose into which the crystals of sodium sulphate and natural and/or artificial fibers are introduced.

The die 12 is constituted by a trapezoidal casing 14 in which the reinforcing fibers are oriented in the longitudinal direction. This body 14 has an extrusion slot 15 formed by a fixed lip 16 and a movable lip 17. This lip can be made adjustable by means of a series of screws 18, thus enabling the width of the slot and therefore the thickness of the extruded sheet A to be adjusted.

According to the invention, as the sheet A leaves the slot 15 of the die it is rolled in an arrangement 19. In this way, the fibers contained in the paste and to which their passage through the die has given an orientation in the longitudinal direction are disoriented without any preferred direction by the rolling taking place at 19 and are disposed in all directions, both longitudinally and transversely.

The rolling arrangement 19 is constituted by two belts 20 and 21 disposed face to face and moving at right angles to the movement of the conveyor 13 and in opposite directions (FIG. 3). These belts are driven by a motor 22 with a speed reducer and variator 23. They move at identical or different speeds. A flexible box 24 fixed at the outlet of the die 12 ensures the guiding of the extruded sheet A between the belts 20 and 21. Fixed plates 25 of rigid material which are disposed at the sides of the die extend between the belts 20, 21 and ensure tightness while permitting the scraping of the belts. These belts 20, 21 are constituted by endless bands of rubber of suitable hardness which are fixed by rivets to roller chains engaging with pinions 26, 27 driven by the motor-variator assembly 22, 23.

The rolling belts 20 and 21 have a greater distance between their upper edges at 28 than between their lower edges at 29, which correspond to the outlet for the sheet. The interval at 29 between the lower edges corresponds to the desired thickness of the sheet A. A suitable device, consisting for example of a series of rollers 30, 31 inside the belts, enables adjustment of the interval to be obtained. Instead of rollers, plane ball bearings can be used, the guide plates forming bearing races.

The speed of the belts 20 and 21 is determined according to the degree of disorientation which it is necessary to give the fibers. In practice, the ratio of the speeds of the belts to that of the conveyor may range between 0.5 and 2. It appears to be advantageous, however, to give the belts a speed close to that of the longitudinal movement of the sheet A that is to say that of the conveyor belt 13. The speed may be identical for the two different belts.

When the sheet A has undergone the rolling effect by the belts 20, 21 it is deposited on the conveyor 13 (FIG. 4) which carries it along towards the coagulating and finishing tank 32. During its journey on the conveyor 13, the sheet may receive an impression by an impression roller 33. The conveyor 13 may have patterns on its surface which give one of the faces of the sheet A a fluted or other decorative appearance.

Of course, the arrangements described above are not of any restrictive nature. In particular, the die may be of any type or profile. The belts for rolling the sheet may be of any kind. In particular, they may be grooved or formed in a composite manner of metal and rubber. It is is also possible to use a rolling arrangement consisting of a single moving belt co-operating with a fixed lip which may or may not be fast with the die. All these variants, which achieve the carrying into effect of the process, come within the object of the present invention.

What is claimed is:

1. Apparatus for the manufacture of artificial skins from a viscose paste to which are added porophorous materials and fibers, such apparatus comprising: an extrusion means for said paste, a means for distributing said paste in a continuous sheet, an endless conveyor receiving said sheet, and a treatment bath for coagulating and finishing said sheet, said paste-distributing means comprising an extrusion box producing a sheet of paste, two belts moving in opposite directions at right angles to said sheet of paste between said extrusion box and conveyor, the sides of said belts which face each other being displaced in opposite directions, and two adjustable lateral guides limiting the space between said two belts, said belts inducing a rolling effect on the sheet with disorientation of the fibers incorporated in the paste, without any reduction in thickness of said sheet.

2. The apparatus of claim 1, wherein said extrusion box is in the form of a trapezium, the base of which corresponds to the distance the lateral guides are apart between the belts.

3. The apparatus of claim 1 wherein said belts are mounted in reciprocal inclination, the space between said belts having a progressively decreasing thickness which is imposed on the sheet of paste.

References Cited

UNITED STATES PATENTS

| 2,712,154 | 7/1955 | Lindquist | 264—108 |
| 2,842,799 | 7/1958 | Politzer | 264—108 |
| 2,899,704 | 8/1959 | Pekarek | 264—108 |
| 2,989,775 | 6/1961 | Pekarek | 264—108 |
| 3,024,150 | 3/1962 | Urbanetti | 264—70 |

ROBERT F. WHITE, Primary Examiner

JEFFERY R. THURLOW, Assistant Examiner

U.S. Cl. X.R.

18—1; 264—108, 210